UNITED STATES PATENT OFFICE.

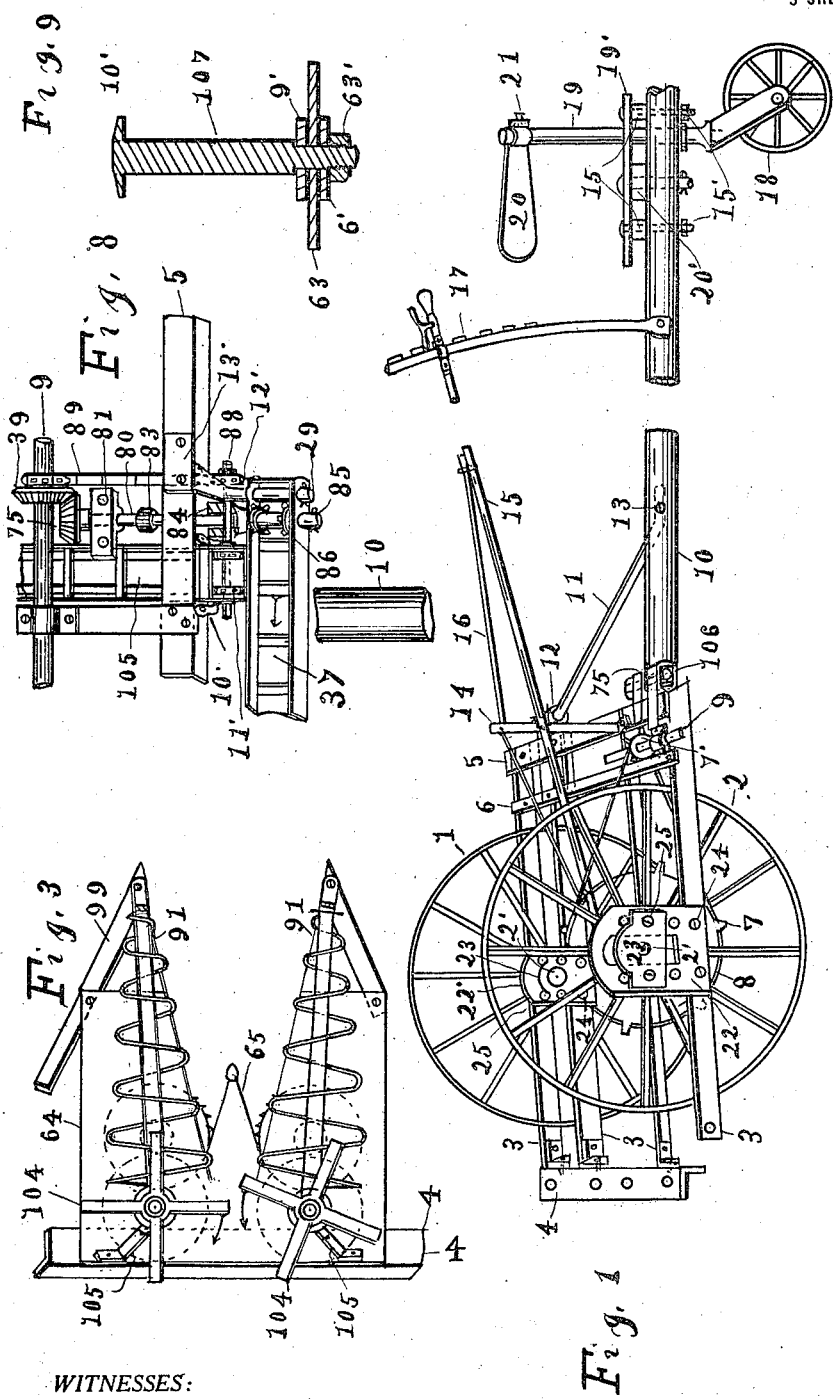

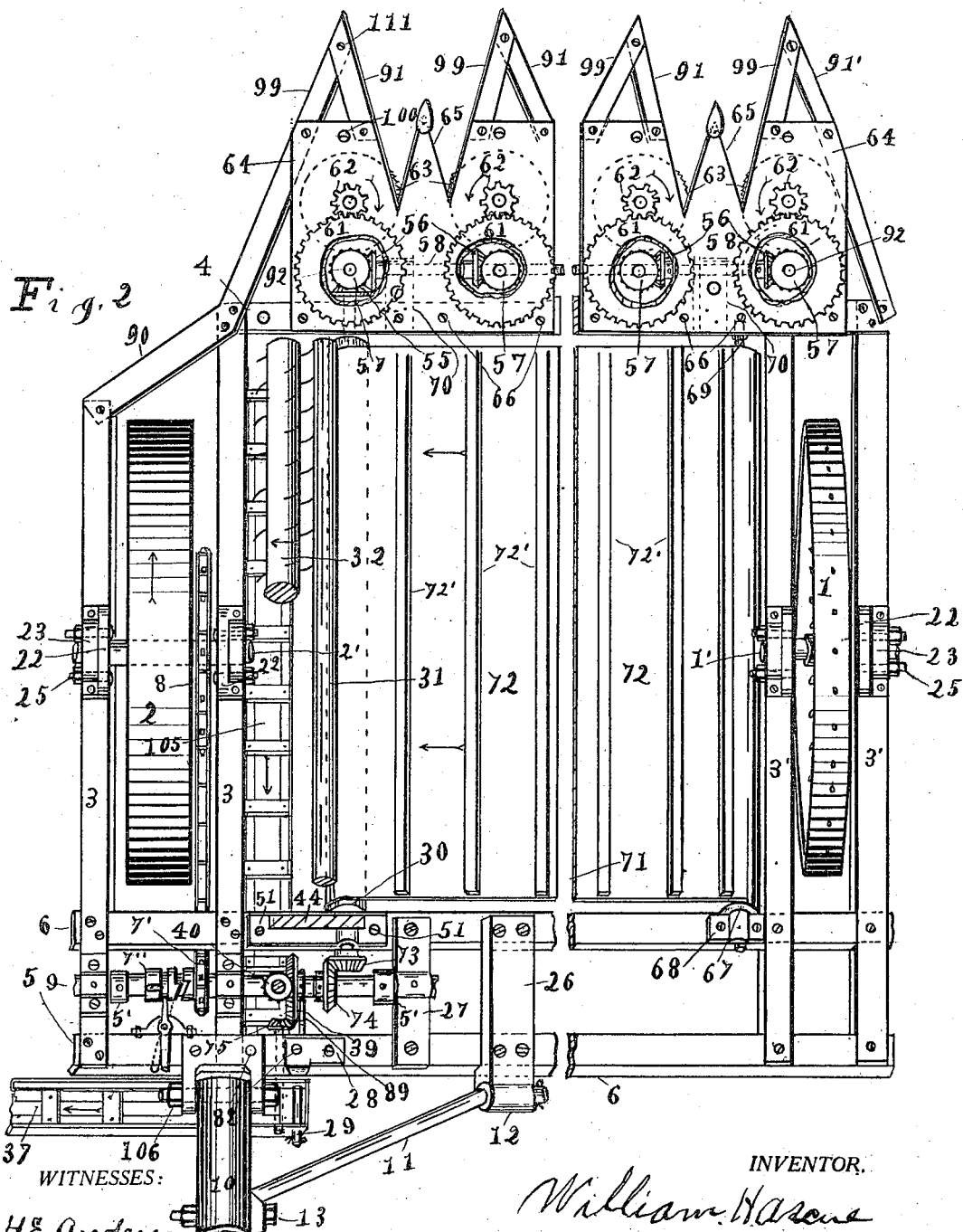

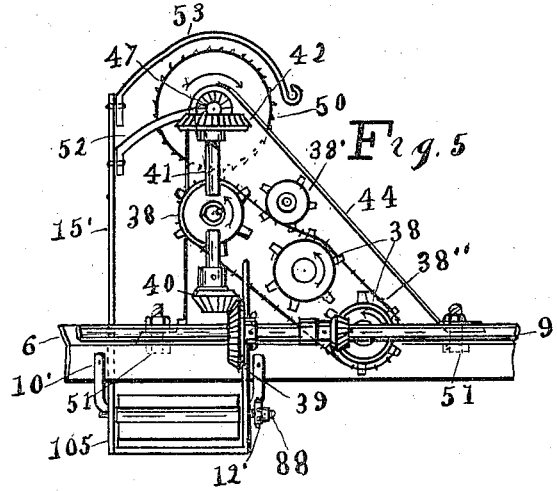
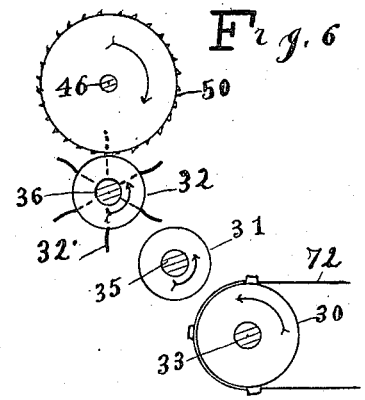
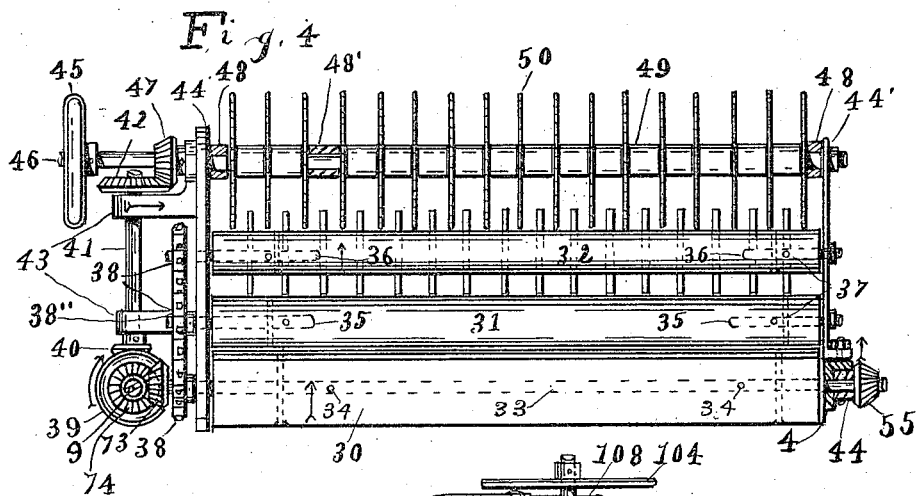
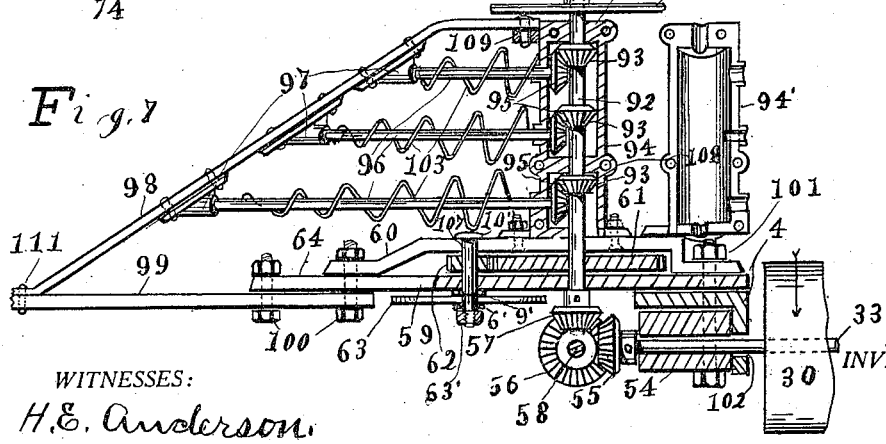

WILLIAM H. ASCUE, OF WICHITA, KANSAS.

CORN-HARVESTER AND ENSILAGE-CUTTER.

1,240,164.  Specification of Letters Patent.  Patented Sept. 18, 1917.

Application filed October 4, 1915. Serial No. 54,069.

*To all whom it may concern:*

Be it known that I, WILLIAM H. ASCUE, a resident of Wichita, in the county of Sedgwick and State of Kansas, have invented certain new and useful Improvements in Corn-Harvesters and Ensilage-Cutters; and I do hereby declare the following to be a full, clear, and exact description of the invention, such as will enable others skilled in the art to which it appertains to make and use the same.

My invention relates to a corn harvester and ensilage cutter and has for its object to provide means to harvest the corn and simultaneously cut it into small particles preparatory to placing it in the silo, thus eliminating the expense and labor of handling the fodder in the usual manner.

Another object is to eliminate waste of fodder due to wind which is very wasteful when fodder is handled in the ordinary manner. With my device I accomplish all the cutting with circular saws, and deliver the material from the machine direct into a wagon to be taken to the silo.

To the accomplishment of these ends and others subordinate thereto, the preferred embodiment of my invention comprehends the construction and arrangement of parts, to be hereinafter described, illustrated in the accompanying drawings, and succinctly defined in the appended claim.

Referring to the drawings: Figure 1 is the fundamental frame-work, carrying my device; Fig. 2, a plan view showing largely the constructive features of my invention; Fig. 3, illustrates the device for conducting the material to be acted upon, to the desired position and circular saws for cutting it off and throwing it back onto the platform canvas; Fig. 4, is an elevation of a plurality of rollers which conduct the material into a multiplicity of circular saws, which cuts the material into the desired fineness; Fig. 5, an end elevation of Fig. 4, showing the construction and organization of elements and coaptation of parts; Fig. 6, is an end view of the rollers and saws; Fig. 7, a side elevation of Fig. 3, and in part in section; Fig. 8 shows the conveyer which receives the ensilage from the saws and conducts it to the elevator and the mechanism for operating same; Fig. 9 is an enlarged sectional view of the cut-off saw and the shaft on which it is mounted. Similar numerals designate similar parts throughout the several figures of the drawings.

Referring to the drawings, 1 and 2 are wheels upon which my device is carried. Said wheels carry a frame composed preferably of angle-iron 3—3—3—3; three of which are united in any desirable manner by a bar 4, and the other ends are affixed to cross bars 5 and 6. A member 75 is fastened to the aforesaid frame and a push-beam 10 is pivotally secured thereto with a bolt 106 and to the aforesaid cross-bars 5 and 6 is transversely secured a bar 26 which is provided with a round transverse hole therein, as at 12, for the reception of the end of a round brace-rod 11, which extends to the beam 10 and is affixed thereto with a bolt 13.

A vertical standard 14 is bolted to the bar 5 and rigidly affixed thereto is a tilting-lever 15, supported by a truss-rod 16, also affixed to the said standard and riveted to the said tilting-lever, which lever is rigidly secured (not shown) to the beforesaid frame. The other end of said lever is provided with a thumb-catch and plays up and down on a curved standard 17, which standard is provided with suitable notches to engage the thumb-catch. It is obvious that with said lever the forward end of the frame as at 4 can be tilted up and down and set in any desired position.

I have provided means for setting the frame up or down with respect to the wheels 1 and 2. Brackets 22 and 22' are provided with a series of holes and have oblong holes therein, are secured to the bars 3—3—3—3 with bolts 24—24, and bearings 23—23 23—23 are movably affixed to said brackets, with bolts 25. The wheel axles 1' and 2' are journaled in the aforesaid bearings. It is obvious when the bearings are moved up and down the axles move freely in the oblong holes in the brackets.

It is to be noted the wheel 1 is an idler while the wheel 2 is a power-wheel and will be hereinafter so designated. A sprocket wheel 7 is attached to the power-wheel 2, which sprocket carries a rearwardly extending chain which engages a wheel 7' loosely mounted on a power-shaft 9 and is engaged by a clutch 7'' operated by the usual shifting lever. This shaft is suitably mounted on the bars 3—3 and a cross-bar 27. Thimbles 5'—5' are affixed on the shaft to eliminate end play.

On said shaft is a bevel-wheel 74 which engages a pinion 73 which is keyed on the shaft 33 (see Fig. 4) extending longitudinally through a roller 30 and is secured therein by pintles 34—34 and on the other end of said shaft is a pinion 55. On the shaft 9, there is another bevel-wheel 39 having integral therewith a sprocket wheel, which will be referred to later. The bars 6 and 4 (Fig. 2) have journaled thereto an idle-roller 67 as shown at 68. Adjacent this roller and on the opposite side of the wheel 1 are angle-bars connected to bars 4—5—6 and are supported by the said wheel as before stated.

On the rollers 30 and 67 is a carrier 72 (for illustration divided as at 71) which has a plurality of transverse ribs 72' which assist in conducting the fodder to be acted upon to the ensilage cutter.

I will now describe the construction and organization of elements that cut and deliver the fodder to the carrier 72, which in turn delivers it to the ensilage cutters (saws). It being desirous to provide a large lateral range, which is made necessary by the variation in the width of the rows of corn apart, I have provided two cut-off saws for each row. My device is preferably constructed to cut two rows of corn.

I provide two steel plates 64—64 (Fig. 2) each having two V-shaped notches therein as shown. These plates are provided with a series of holes therein (see Fig. 7) through which pass bolts 100, 101, and the vertical shafts 92, 107. I provide a bar 60 of the form shown, with holes to register with the holes in the plate 64. The holes in the plate and the bar 60 make bearings for the shafts 92 and 107. The shaft 92 extends upwardly approximately three feet and has thereon three bevel pinions 93—93—93 and is within a casing 94 and is provided with suitable bearings 108—108, said casing being bolted to the bar 60. The said pinions engage similar pinions on the horizontal shafts, 103—103—103, which have their bearings also in the casing 94 and the other ends of said shafts are positioned, secured in boxings 97, attached to an inclined bar 98, which is connected to the end of the bar 99, the other end of the bar being affixed to the plate 64 with bolts 100. The top end of the bar 98 is fastened to a lug 109 laterally extending from the casing 94. On the said shafts are spirals 103—103—103, which substantially diverge to their rear ends and thereby gather the corn to the desired position preparatory to cutting. On the top ends of the shafts (see Fig. 3) are laterally extending arms 104 which rotate in opposite directions and receive the corn from the spirals when cut off and throw it back on the carrier 72 which transmits it to the circular saws 50.

The cut-off saws 63 are secured to the shaft 107 with a jam-nut 63' (see Fig. 9) the said shaft having a rim 10' on its upper end and a reduced extension on its lower end to receive the saw, and washers 6' and 9' so that when the jam-nut is screwed up, the saw is clamped between the said washers which prevents movement. On the said shaft is a spur pinion 62, being positioned between the bar 60 and the plate 64, which is engaged by a spur-wheel 61 on the shaft 92.

The shaft 33 (Fig. 7) passes through a hole 102 in the angle-bar 4 and is journaled in a box 54 shown in section which is held in proper relation to said bar by the bolt 101. The section of the casing 94' is positioned on the section 94 and affixed thereto with suitable bolts, which casing makes a complete housing for the gearing within.

I have described one of these mechanisms only, as shown in Figs. 3-7, as the description of one will suffice for all as they are exactly alike.

The transverse transmission shaft 58 (best shown in Fig. 2) is rotated by the pinion 55 and drives all four saws. It is to be noted that each pair of saws turns in opposite directions as does each set of spirals.

To the forward ends of the plates 64—64 are attached bars 99 and 91. The bar 91 extending back and making connection with the bar 4 and the bar 99 is attached to the plate 64 and the bars 4 and 3. The transmission shaft 58 is journaled in suitable bearings 70 (shown in dotted lines) attached to the bar 4 and plates 64—64.

The bracket 44, a section of which is shown in Fig. 2, is secured to the bar 6 with bolts 51—51 and has two lateral extensions 43—43 in which is journaled the upright shaft 41. On said shaft are two cog-wheels 40—42. The pinion 40 engages the wheel 39 and the wheel 42 engages a pinion 47 on the shaft 46 on which a plurality of saws 50 are mounted as shown in Fig. 4. Any desired number of saws are placed on this shaft. Between these saws on the shaft are thimbles 49, shown in section 48'. Jam-nuts 48—48 right and left hand are placed on this shaft and the saws are therewith securely clamped thereon. Mounted on the outer end of the shaft 46 is a fly wheel 45. The other end of shaft 46 and the journals of the rollers 31—32 are positioned in a bracket 44' which is shaped on its lower edge to give the plate 64 and the spur-wheel 61 a clearance thereunder and is bolted down on the bar 4. The end of the shaft 33 is secured in the bearing 54 as before described. In the roller 32 are teeth 32' and are somewhat curved as shown in Fig. 6 and in their rotation they pass midway between the saws 50. The function of these teeth will be referred to later.

On the ends of shafts 33—35—36 are sprocket wheels 38—38—38, which are actuated by a chain 38". Said chain is provided with a tightener 38'. It is obvious that these three rollers are rotated in the same direction. Beneath the saws 50 is a silage conveyer 105, shown in plan-view in Fig. 2, and an end view in Fig. 5, being carried by stirrups 10', one only of which is shown in Fig. 8.

I have shown an upward extension (Fig. 5) of the conveyer as at 15', to the rear of the saws, which insures the ensilage falling down onto the conveyer and attached to said extension is a metallic hood 53 which protects the saws and to said extension is attached curved fingers 52 which are positioned midway between the saws and terminate near the axis of the saws. The function of said fingers is to prevent ensilage from collecting between the saws. This conveyer is driven by a chain 89 from a sprocket on the shaft 9 and conducts the silage to the elevator 37 which delivers it into a wagon. This elevator requires that it should be pivotally secured at its lower end in order that the free end thereof may be raised and lowered. 13' shows a plate bolted to the bar 5 and having a downward extension and terminating in a round portion 29 on which is pivotally mounted the lower end of said elevator. Passing through the elevator is a shaft 85 having thereon sprockets 86 which operates a silage carrier. One end of said shaft is an enlarged portion (shown in section as at 84) which has a square hole therein to receive the squared end of a shaft and is movable longitudinally in said hole. The other end of this shaft is connected by a universal coupling to a shaft 80, journaled in a bearing 81, which is secured to the lower side of the bar 5 with bolts 82 (Fig. 2) and carries a pinion 75 operated by the wheel 39. Thus it will be seen the up and down movement of the elevator is provided for by the movable connection 84 and the joint 83. I have not shown means for raising and lowering the free end of the elevator as that is patent to all men conversant with wheat headers.

A rudder-wheel 18 is placed in a bifurcated shaft 19 which is pivotally positioned in the beam 10 and extends upward, and on its free end is a lateral member 20 affixed by a set-screw 21. A foot board 19' is positioned above the beam by means of studs 15'—15' and bolts 15". 20' indicates a section of a four-horse evener.

Having described the construction and organization of my invention, I will now describe its operation generally. The machine is moved forward and the spirals 103 bring the corn into a common center and into the cut-off saws, and when it is cut the arms 104 throw it back on the carrier 72 and it is carried along until it comes in contact with the roller 31 and is started up and the teeth 32' pick it up and feed it into the saws 50, where it is immediately made into silage and from thence is deposited into the conveyer where it is delivered into the elevator and then into a wagon and taken to a silo.

From the foregoing it will be observed that I have produced a simple, compact and durable machine, comprehending positively coöperating elements, but while the present embodiment is believed at this time to be preferable, still I do not desire to limit myself to the structural details defined, but reserve the right to effect such changes, modifications and variations as may be comprehended within the scope of the protection prayed.

What I claim is:—

In a corn-harvester and ensilage-cutter, a frame suitably mounted upon wheels, one of which is a power-wheel, cut-off saws and means for operating said saws, suitably attached to said frame, means for conducting the corn to said saws to be cut off, a carrier to receive said corn when cut, and means for knocking the corn back on the carrier when cut, a roller to receive the corn from the carrier, a plurality of saws mounted upon a shaft, a roller, provided with curved teeth to receive the corn from the last named roller, and deliver it to the aforesaid saws to be cut into the desired fineness, a conveyer to receive the finished material from the saws and deliver it into an elevator and means to operate said elevator and conveyer and deliver it into a vehicle.

In testimony whereof, I have signed this specification in the presence of two subscribing witnesses.

WILLIAM H. ASCUE.

Witnesses:
ARTHUR E. DEMAREE,
E. G. DEMAREE.